G. MANDER.
Bake Pan.

No. 229,158.    Patented June 22, 1880.

Attest:
J. Henry Kaiser
J. A. Rutherford

Inventor:
George Mander
By James L. Norris
Atty.

UNITED STATES PATENT OFFICE.

GEORGE MANDER, OF BIRMINGHAM, ENGLAND.

BAKE-PAN.

SPECIFICATION forming part of Letters Patent No. 229,158, dated June 22, 1880.

Application filed December 5, 1879.

*To all whom it may concern:*

Be it known that I, GEORGE MANDER, of Birmingham, England, have invented an Improved Dish for Table Use, of which the following is a full, clear, and exact description, reference being had to the accompanying drawings, making part of this specification, and in which—

Figure 1:
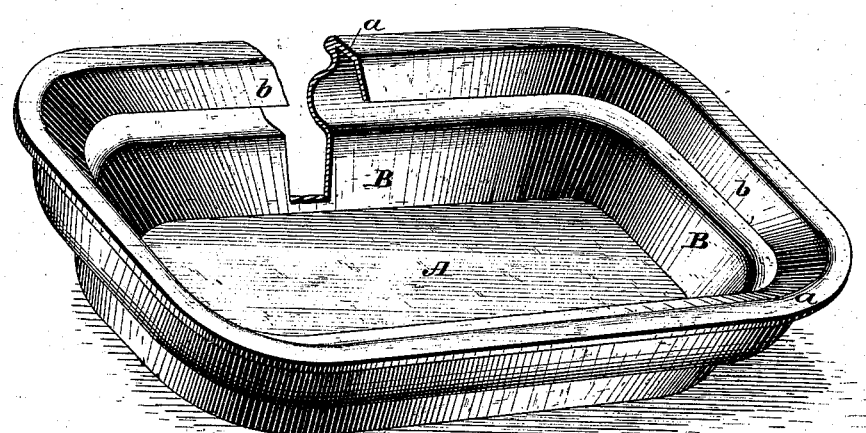
Figure 2:
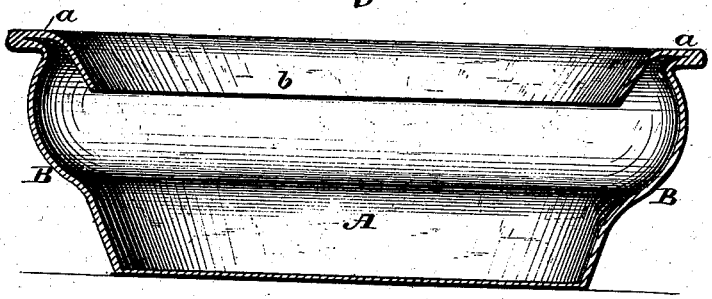
Figure 3:
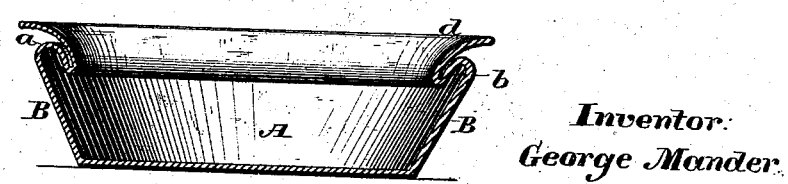

Figure 1 is a perspective view of a dish or pan constructed according to my invention, and Fig. 2 is a vertical section through the center of a dish or pan of the same construction. Fig. 3 is a section of a modification of my invention.

The object of my invention is to provide an improved dish in which liquid and semi-liquid contents are prevented from flowing or splashing over the edge or edges thereof in transit, or when otherwise oscillated; and to this end the invention consists in a dish having outwardly-inclined sides and ends and a flange or lip projecting inwardly from its top edges, but not extending over its bottom. The entire area of the bottom is thus left unobstructed, while at the same time overflow is prevented.

In the drawings, the letter A indicates a dish, which may be formed of porcelain, delf, or similar material. Its side and end walls, B, are inclined or flanged outwardly, and from its top edge a lip or flange, *a*, projects inwardly for the whole of its inner periphery. This lip terminates in a downwardly-projecting lip or bend, *b*, which may be produced by stamping, pressing, molding, or otherwise, so as to form a continuous bend or sealing-groove, up which the liquid rises when the dish is moved about or its liquid contents agitated, the lip or flange preventing overflow, waste, and uncleanliness. The flange or lip overhangs the flaring walls, but neither the flange *a* nor lip *b* overhangs the bottom of the dish, which is therefore left entirely unobstructed, and convenient access is had to all parts of the dish.

In the modification, Fig. 3, in addition to the inwardly and downwardly projecting lips or flanges, I form an outwardly-flaring lip, *d*, which gives the article the appearance of an ordinary dish.

Vessels of various kinds for household, dairy, and other uses, including cuspadores, have been in some instances provided with an inwardly-projecting removable flange and in other instances with a circumferential contraction intermediate of the top and bottom, for preventing overflow of the contents of the vessel on its being moved about; but in all such the flange or the contraction has extended so far inwardly as to cover the major portion of the bottom of the vessel, and thus the article is rendered almost useless, as access to the interior for cleansing or for removing the contents is interrupted, and it therefore cannot be used for many purposes to which my invention is applicable.

What I claim is—

1. As a new manufacture, a dish made as an integral of pottery, porcelain, or analogous material, the walls of which flare outwardly from the bottom and terminate in an inwardly and downwardly projecting flange or rim, the inner edge of which does not extend beyond the angle formed by the walls and the bottom, as herein shown and described, whereby a greater area is secured between the inner edge of the flange than the entire area of the bottom.

2. A dish for table use having outwardly inclined or flaring walls, from the top edges of which projects an inwardly and a downwardly inclined flange or lip, the space surrounded by the inner edges of said lips or flanges being of the same shape and greater than the size of the bottom of the dish, substantially as described.

GEORGE MANDER.

Witnesses:
JOHN KENDRICK,
    *Birmingham, England.*
JAMES BROOKES,
    *Birmingham, England.*